R. E. HALL.
DENTAL OCCLUDING FRAME.
APPLICATION FILED JAN. 28, 1914.

1,222,203.

Patented Apr. 10, 1917.
4 SHEETS—SHEET 1.

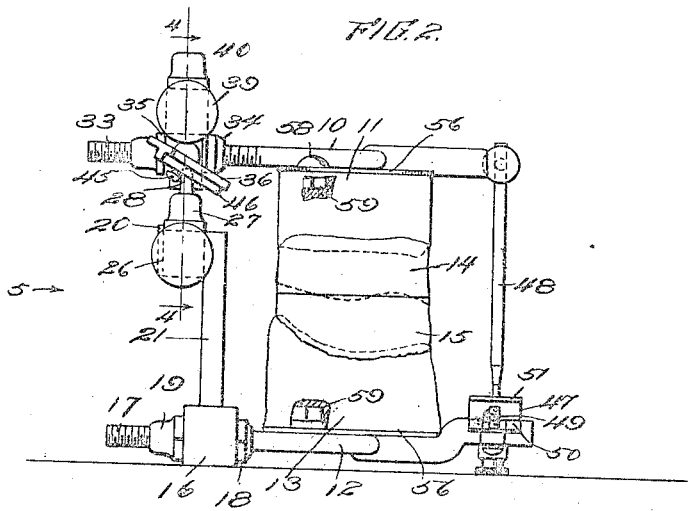
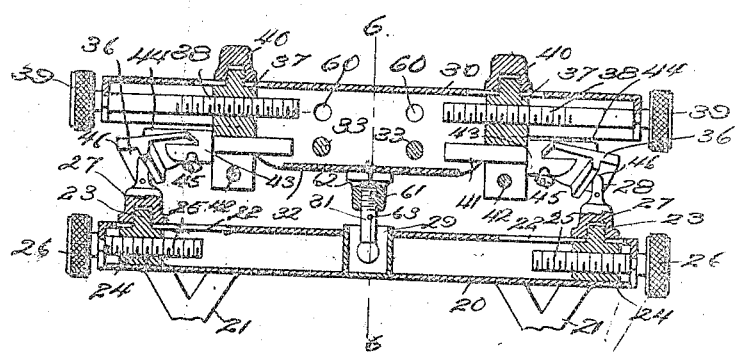
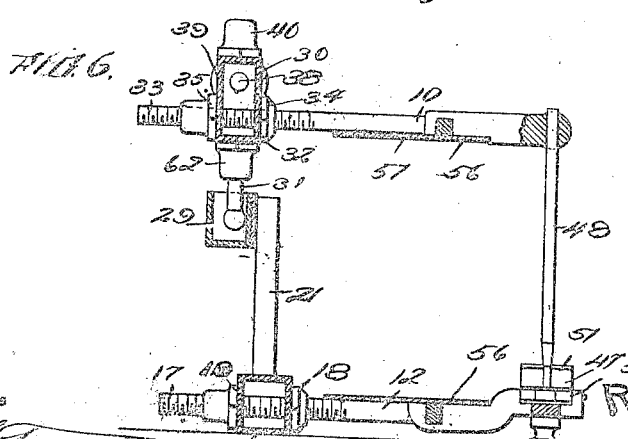

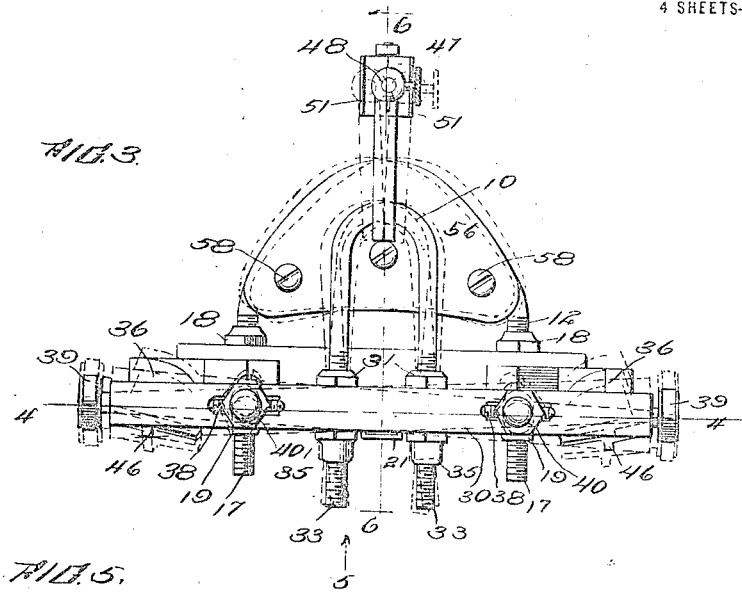
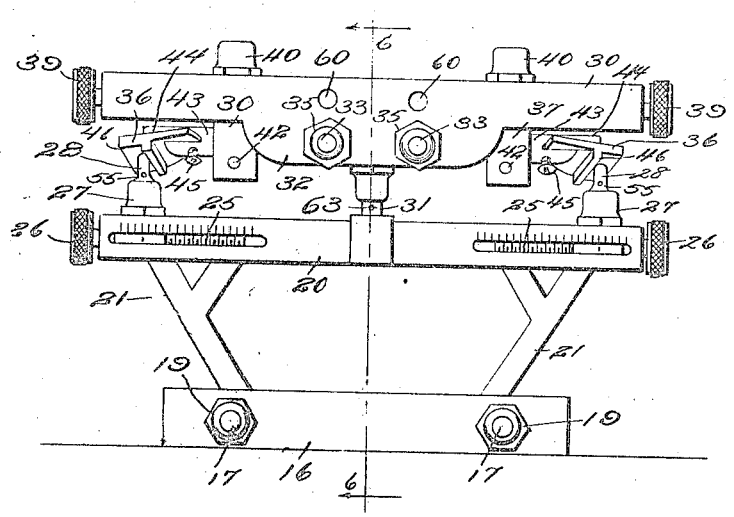
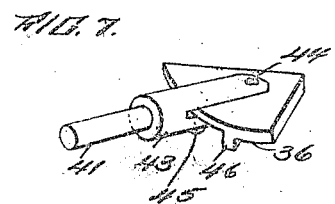

R. E. HALL.
DENTAL OCCLUDING FRAME.
APPLICATION FILED JAN. 28, 1914.
1,222,203.
Patented Apr. 10, 1917.
4 SHEETS—SHEET 4.
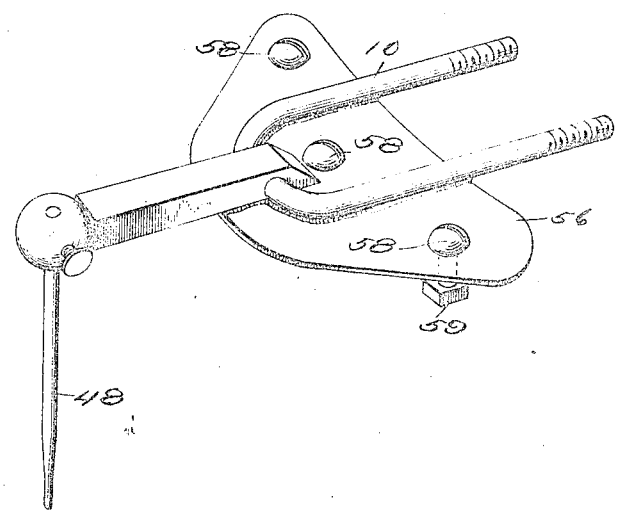
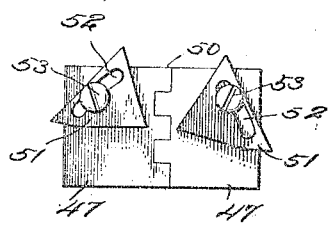
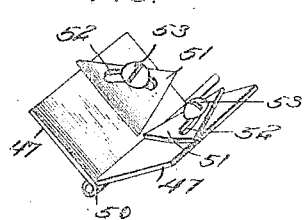
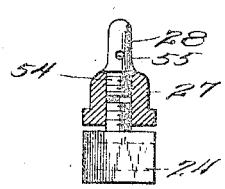
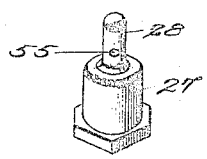
Inventor
Rupert E Hall,
By Mason Fenwick Lawrence,
Attorneys
Witnesses

UNITED STATES PATENT OFFICE.

RUPERT E. HALL, OF HOUSTON, TEXAS.

DENTAL OCCLUDING-FRAME.

1,222,203.

Specification of Letters Patent.

Patented Apr. 10, 1917.

Application filed January 28, 1914. Serial No. 815,020.

*To all whom it may concern:*

Be it known that I, RUPERT E. HALL, a citizen of the United States, residing at Houston, in the county of Harris and State of Texas, have invented certain new and useful Improvements in Dental Occluding-Frames; and I do hereby declare the following to be a full, clear, and exact description of the invention, such as will enable others skilled in the art to which it appertains to make and use the same.

This invention relates to dental occluding frames and has for an object to provide an instrument of the class ordinarily known as articulators which is capable of reproducing all of the movements of the human jaw in incising and masticating.

A further object of the invention is to provide a frame adapted to carry a replica of the upper jaw with a separate frame adapted to carry a replica of the lower jaw so constructed that as the upper jaw replica is moved laterally the front of such jaw describes an arc relative to the lower jaw both vertically and horizontally.

Specifically stated, the form of the invention as hereinafter described provides an instrument having cams corresponding to the glenoid fossæ of the human jaw with means for pivoting such cams so that as one advances the other retreats exactly as is found in a lateral movement of a human jaw and simultaneously raised and lowered relative to the condyles whereby an arc is described at right angles to the medial plane of the jaw.

With these and other objects in view the invention comprises certain novel constructions, combinations and arrangement of parts as will be hereinafter more fully described and claimed.

In the drawings:

Fig. 2 is a view of the occluding frame in side elevation with a wax model in position showing in full lines a model as first secured to the instrument and in dotted lines somewhat exaggerated the lines to which such wax model is ground by a continual lateral movement with abrading material between the sections of the model.

Fig. 3 is a top plan view of the occluding frame showing in dotted lines some of the movements of the instrument.

Fig. 4 is a sectional view of the instrument taken on line 4—4 of Figs. 2 and 3.

Fig. 5 is a rear view of the instrument as indicated by arrow 5 at Figs. 2 and 3.

Fig. 6 is a sectional view on the medial line as indicated by line 6—6 of Figs. 1, 3, 4 and 5.

Fig. 7 is a detail perspective view of one of the cams corresponding to the glenoid fossa of a human jaw and showing its various adjustments.

Fig. 8 is a perspective view of the top model supporting frame.

Fig. 9 is a top plan view of the front V-shaped cam.

Fig. 10 is a perspective view of the front V-shaped cam.

Fig. 11 is a view partially in section of the adjustment of the condyle pins.

Fig. 12 is a view in side elevation of one of the condyle pins inserted in the lock nut.

Like characters of reference designate corresponding parts throughout the several views.

Figure 1:
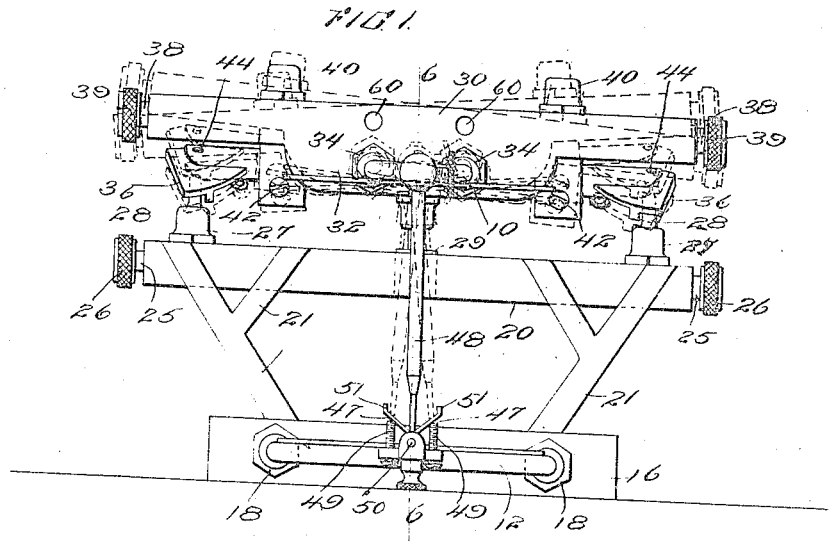
Figure 1 is a view in front elevation of the improved occluding frame showing in dotted lines certain of the movements as the movable member is moved laterally.

The dental occluding frame which forms the subject matter of this application takes the place of the usual and ordinary dental articulator formerly employed in prosthetic dentistry and especially used in the matter of making artificial dentures but the present occluding frame goes a step farther than the ordinary articulator in that it does not provide hinging of the parts but does provide for correct occlusion to correspond to the occlusion of the natural dentures of the patient being operated upon.

In the present instrument a frame 10 is provided to which is secured in use a base 11 composed of plaster of Paris or other similar solidifying material the surface of which is formed from an impression of the roof of the mouth of the patient. A frame 12 is also provided upon which a cast 13 is secured in action carrying upon its upper surface the impression of the lower jaw of the patient. Upon the adjacent surfaces of such impressions, wax models 14 and 15 are respectively formed, the surfaces contacting with the impressions of course being the complement respectively of the roof of the mouth and the lower jaw. As first placed upon the bases 11 and 13 the wax models 14 and 15 contact substantially upon the occlusal plane. It is essential that these wax models be ground relative to each other so that they shall provide curves which correspond accurately to the curvature of the occluding surfaces of the teeth of the patient in masticating and to provide such grinding the instrument as hereinafter described is employed.

The instrument comprises a base member 16 to which the frame 12 is adjustably secured by forming such frame 12 with screw-threaded extremities 17, such extremities extending through the base member 16 and secured adjustably in position by the lock nuts 18 and 19. It will be apparent, therefore, that the base 13 carried by the frame 12 may be moved relative to the base 16 by the use of such adjustment to correspond to the length of the jaw of the patient.

Above the base 16 a support 20 is erected held in position by any approved form of bracing as indicated at 21. The supporting member 20 is preferably tubular in formation as indicated more particularly at Fig. 4 with slots 22 formed in its upper surface through which extend threaded pintles 23 carried upon nuts 24 slidable within such tubular member 20 and controlled by screws 25 extending through the ends of such tubular members and provided with knurled heads 2⁶. Upon the pintles 23 nuts 27 are mounted serving as lock nuts so that the adjustment of the pintles 23 may be secured in any adjustment provided by rotating the screws 25, such nuts carrying pins 28 corresponding to the condyle of the human jaw. It will be apparent that by loosening the nuts 27 and rotating the screws 25 the condyles will thus be moved to vary the interval between such condyles to correspond to the width of the jaw of the patient.

The tubular member 20 also carries a bearing of any approved form shown at Figs. 4 and 6 as a square box 29, it being understood that the shape of the box is wholly immaterial to the present invention as will be apparent from further description of the instrument.

Above the supporting tubular member 20 an additional tubular member 30 is mounted having a pin 31 mounted in the bearing box or socket 29. The tubular member 30 is provided with an off-set 32 through which are extended the extremities 33 of the frame 10 with lock nuts 34 and 35 for securing the adjustment of the frame 10 the same as described for securing the adjustment of the frame 12 relative to the base 16. It will be apparent, therefore, that the tubular member 30 with the frame 10 may move about the axis of the pin 31 in a horizontal plane. The movement of the human jaw transversely relative to the medial line is, however, not in horizontal plane but as the condyle upon one side moves forward it also moves downwardly while the corresponding condyle upon the opposite side of the jaw moves rearwardly and upwardly. To provide for such movement cams 36 corresponding to the fossæ are carried by the tubular member 30 in engagement with the pintles 28 corresponding to the condyles as shown particularly at Figs. 4 and 5. It will be noted from Fig. 2 that these cams 36 are set upon angles relative to the occlusal plane and that the pivoting pintle 31 engages against the front of the box 29 held yieldingly in such position by the incline of the cams 36 and the weight of the structure. It will be apparent, therefore, that as the frame 10 is moved transversely relative to the medial line one of the cams 36 will ride down upon one of the pins 28 while the other cam will ride up upon the corresponding pin, consequently the member 30 will have a rocking motion not only in a horizontal plane but also in a vertical plane. By this combination of rocking motions the models carried by the bases 11 and 13 are moved in arcs corresponding to the movement of the jaw in moving laterally relative to the medial line.

It is obvious that the cams 36 must be adjustable to vary the interval to correspond to the adjustment of the pins 28 and such adjustment is accomplished in a manner similar to the adjustment of the pins 28 by mounting nuts 37 in the tubular member 30, such nuts being moved by screws 38 controlled by knurled heads 39. Lock nuts 40 are likewise provided for locking the nuts in such adjusted position. The cams 36 are mounted upon pins 41 inserted through the lower extremities of the nuts 37, such extremities being bifurcated and a clamping screw 42 employed for clamping the pins 41 in rotary adjustment. Upon the remote sides of the nuts 37 the pins 41 carry bifurcated heads 43 in which the cams 36 are pivoted as indicated at 44. A set screw 45 is provided for clamping the cams in adjustment upon their pivots 44. It will be obvious, therefore, that the cams 36 are not only adjustable to vary the interval between such cams but are also adjustable rotatably upon the pins 41 and angularly upon their pivots 44. The cams 36 carry ribs 46 which engage against the pins 28 to prevent lateral movement of the tubular member 30 and its associated parts, such ribs being located approximately upon an arc with the pin 31 as the center. It will be apparent especially from Fig. 6 that the pin 31 bears normally only against the front of the bearing box but is free to move as occasion may require.

A still further movement is provided for in employing at the front of the frame 12 an approximately V-shaped cam or platform 47 with a pin or rod 48 carried at the extremity of the frame 10 and bearing upon this cam 47 for supporting said frame in its incisal position.

The normal position of the instrument is with the lower extremity of the pin 48 bearing in the angle of the V-shaped cam 47 but as the frame 10 is moved laterally the extremity of the pin rides up the inclines of the cam 47 to correspond to the slight retreating of the outer extremity of the jaw from the occlusal plane in a lateral movement. The angle of this V-shaped cam is made also adjustable by means of screws 49 which bear under the edges of such wings which are hinged together as at 50 and are provided with flanges 51 at their edges to prevent the pin 48 from slipping over the edges of such cam as the pin is moved laterally of the medial line.

Instead of employing the simple V-shaped cam 47 it is sometimes desirable to provide further adjustment by mounting upon the wings of such V-shaped cam other cam stops 51. As will be noted especially from Figs. 9 and 10 these stops 51 are provided with slots 52 through which are inserted screws 53 so that the said stops may be varied as to angularity regularly or irregularly as shown at said figures.

It is also desirable to provide vertical adjustment of the condyle pins for which purpose the said pins are provided with screw threaded extremities 54 as shown at Fig. 11 which are inserted in the nuts 27 and any convenient means for operating said screw adjustment is provided as the hole 55 into which any convenient instrument may be inserted.

To enable a dental operator to employ the occluding frame for a number of cases at the same time it is desirable to make the device so that the models may be removed from the frame. For this purpose plates 56 are secured to the model bows 10 and 12 and provided with screw openings 57 through which are inserted screws 58. Nuts 59 are carried upon these screws 58 and the plaster models 11 and 13 are formed about such screws and nuts. The nuts are, therefore, embedded in the plaster material as shown in Fig. 2 which discloses a portion of the plaster material cut away to show the nut and the screw may be removed from the nut at pleasure and the models removed from the frame. The nuts remain thus embedded in the plaster and may be returned to the frame when desired with the assurance that they will be accurately positioned as when formed.

The tubular member 30 is also provided with a set of openings 60 through which the extremities 33 of the model bow may be inserted to vary the relation of the model bow to such tubular member 30.

It is also desirable to have the pivoting member 31 adjustable for which purpose it is provided with screw threads 61 which are inserted into a nut 62 rigid with the tubular member 30 as shown more particularly at Fig. 4, an opening 63 being also provided for inserting an instrument to rotate such pin.

It will be noted that every part which produces a variation of movement in the frame 10 is made adjustable and all such adjustments are regulated accurately in accordance with measurements taken of the patient to which the denture is to be fitted. By such accurate measurements the instrument is capable of being adjusted to reproduce faithfully each and every movement and all combinations of movements as resulting from the use of natural teeth in incising and masticating. As shown at Figs. 3 and 6 the frames 10 and 12 are constructed by continuing the extremities 33 and 17 in a complete U which are connected at their curves to the extremities of such frame. It is to be understood, however, that the exact formation of such frames is wholly immaterial to the present invention.

It is also obvious that the tubular member 30 and the supporting member 20 are not connected permanently so that the frame 10 with its base 11 may be lifted from the base 13 and frame 12 for manipulation and that the same may be returned to position at any time with the adjustment accurately retained for testing.

Figure 13:
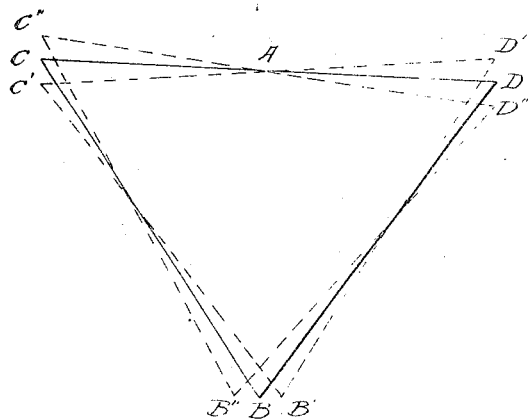
Fig. 13 is a diagrammatic view of the action of the frame.

At Fig. 13 a diagrammatic view is shown of the movement of the frame only in a horizontal plane. In that figure the point A corresponds to the pivot pin 21 about which the triangle B C D oscillates. The point D is the front of the instrument designated by the pin 48 and it will be apparent, therefore, that this pin 48 will move upon an arc with the point A as the center, and that the points C and D will move alternately forwardly and backwardly from normal. These points C and D correspond to the cams 46 and also as will be apparent move in arcs with the point A as their center.

While this movement is illustrated at Fig. 3 on the instrument itself it is believed that the diagrammatic illustration as shown at Fig. 13 is desirable for a clearer comprehension of the movement of the device. It is believed that the rocking motion or the movement of the frame in its vertical plane will be obvious from an examination of Fig. 1.

I claim:

1. A dental occluding frame comprising model supporting frames, and pivotal means connecting the frames together and restricting them to relatively rock upon an axis in the medial line posteriorly of the bases.

2. A dental occluding frame comprising model supporting frames; means pivoting the frames together at the medial line posteriorly of the bases; and means coöperative with said pivoting means providing a simultaneous rocking upon the pivot of one of the frames both in a horizontal and a vertical plane.

3. A dental occluding frame comprising a base frame; an upper frame pivoted to the base frame upon a medial line; and cams carried by one of said frames, one being adapted to ride up and the other down as the upper frame is moved upon its pivot and being restricted by said pivot to move correspondingly.

4. A dental occluding frame comprising a base frame; supporting relatively adjustable pins carried by the base frame; an upper frame; inclined cams carried by the upper frame bearing upon the pins; and central pivoting means to cause one cam to ride upwardly upon its pin as the other moves downwardly upon its pin.

5. A dental occluding frame comprising a base frame; pins extending upwardly from the base frame and adjustable to vary the interval between such pins; a superposed frame; inclined cams carried by the superposed frame bearing upon the pins; means arranged to adjust the cams to vary the interval to correspond to the interval of the pins; and a central pivot intermediate the pins.

6. A dental occluding frame comprising a base frame; relatively adjustable pins extending upwardly from the base frame; a superposed frame; cams carried by the superposed frame in engagement with the pins; and means arranged to adjust the inclination of the cams relative to the pins.

7. A dental occluding frame comprising a base frame; a superposed frame carried above the base frame; pivotal means restraining the superposed frame to rock relative to a horizontal and a vertical plane as the superposed frame is moved laterally of the medial line; and a transversely inclined cam providing an independent rocking motion of the front of the superposed frame.

8. A dental occluding frame comprising a base frame having a socket disposed in the vertical medial plane of said frame, supports disposed upon opposite sides of said socket, an upper frame having inclined surfaces arranged to ride upon said supports, and a projection depending into said socket coöperative therewith to effect a substantially equal relative movement of said inclined surfaces and supports in opposite directions.

9. In a dental occluding frame, a platform for an incisal stay rod, rotatable vertically upon the model support.

In testimony whereof I affix my signature in presence of two witnesses.

RUPERT E. HALL.

Witnesses:
ROBT. T. LANG,
L. L. MARRILL.